(12) United States Patent
Imanilov et al.

(10) Patent No.: US 12,074,676 B2
(45) Date of Patent: Aug. 27, 2024

(54) BEAMFORMING CODEBOOK SYNTHESIS IN A WIRELESS COMMUNICATIONS SYSTEM (WCS)

(71) Applicant: Corning Research & Development Corporation, Corning, NY (US)

(72) Inventors: Benjamin Imanilov, Hod haSharon (IL); Viacheslav Viacheslavovich Ivanov, Espoo (FI); Shirish Nagaraj, Pleasanton, CA (US); Deepak Pengoria, Milpitas, CA (US); Evgenii Pustovalov, Saint-Petersburg (RU)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/993,141

(22) Filed: Nov. 23, 2022

(65) Prior Publication Data
US 2024/0171248 A1      May 23, 2024

(51) Int. Cl.
*H04B 7/06*         (2006.01)
*H04B 7/0456*    (2017.01)

(52) U.S. Cl.
CPC ......... *H04B 7/0639* (2013.01); *H04B 7/0456* (2013.01); *H04B 7/0617* (2013.01)

(58) Field of Classification Search
CPC .... H04B 7/04; H04B 7/04026; H04B 7/0408; H04B 7/0456; H04B 7/0473;
(Continued)

(56) References Cited

U.S. PATENT DOCUMENTS 8,121,235 B1 * 2/2012 Sun ............... H04L 25/03343
                                                                 375/299
11,784,693 B1 * 10/2023 Imanilov ........... H04B 7/043
                                                                375/252
(Continued)

FOREIGN PATENT DOCUMENTS

WO    WO-2020190089 A1 *   9/2020   ........... H04B 7/0417

OTHER PUBLICATIONS

A. M. Geoffrion, "Proper Efficiency and the Theory of Vector Maximization," Journal of Mathematical Analysis and Applications, vol. 22, 1968, pp. 618-630.
(Continued)

*Primary Examiner* — Young T. Tse
(74) *Attorney, Agent, or Firm* — William D. Doyle

(57) ABSTRACT

Beamforming codebook synthesis in a wireless communications system (WCS) is provided. A wireless node simultaneously emits multiple reference beams in a coverage area based on a set of codewords that is optimized for a specific number of antenna elements in an antenna array. The wireless node may need to emit the reference beams using a different number of the antenna elements in the antenna array. Herein, the wireless node is configured to determine a different set(s) of codewords that is fine tuned for forming an identical number of the reference beams from a different number of the antenna elements and steered toward identical directions. In addition, the wireless node can dynamically select an appropriate set of codewords in response to different operating conditions. As such, it is possible to switch transparently, from both wireless node and end user perspectives, between different antenna array configurations under different operating conditions.

20 Claims, 10 Drawing Sheets

(58) Field of Classification Search
CPC .. H04B 7/0481; H04B 7/0617; H04B 7/0639; H04B 7/0695; H04B 7/06952; H04B 7/088; H04W 72/046
USPC .................. 375/260, 267; 370/334, 335, 342
See application file for complete search history.

(56) References Cited

U.S. PATENT DOCUMENTS

| | | | | |
|---|---|---|---|---|
| 2008/0081669 | A1* | 4/2008 | Kwon | H04B 7/0658 455/561 |
| 2017/0366242 | A1* | 12/2017 | Lee | H01Q 3/24 |
| 2019/0173537 | A1* | 6/2019 | Cai | H04B 7/0608 |
| 2020/0358498 | A1* | 11/2020 | Mo | H04B 7/0695 |
| 2021/0314048 | A1* | 10/2021 | Nagaraj | H04W 80/06 |
| 2022/0149907 | A1 | 5/2022 | Goransson | |
| 2022/0155439 | A1 | 5/2022 | Rindal et al. | |
| 2022/0159480 | A1 | 5/2022 | Lu et al. | |
| 2022/0173783 | A1 | 6/2022 | Dash et al. | |
| 2022/0191855 | A1 | 6/2022 | Akkarakaran et al. | |
| 2022/0201389 | A1 | 6/2022 | Hassani et al. | |
| 2022/0201675 | A1 | 6/2022 | Akkarakaran et al. | |
| 2022/0385312 | A1 | 12/2022 | Kruh et al. | |

OTHER PUBLICATIONS

D. Bertsimas, V. F. Farias and N. Trichakis, "The Price of Fairness," Operations Research Center, Massachusetts Institute of Technology, vol. 59, No. 1, pp. 17-31, 2011.

Imanilov; "Beamforming Synthesis for Initial Access Fairness in Wireless Networks"; IEEE; 2022 pp. 46-48.

W. Ogryczak, M. Pioro and A. Tomaszewski, "Telecommunications network design and max-min optimization problem," Journal of Telecommunications and Information Technology, pp. 99-124, 2004.

\* cited by examiner

BEAMFORMING CODEBOOK SYNTHESIS IN A WIRELESS COMMUNICATIONS SYSTEM (WCS)

BACKGROUND

The disclosure relates generally to radio frequency (RF) beamforming in a wireless communications system (WCS), which can include a fifth generation (5G) system, a 5G new-radio (5G-NR) system, and/or a distributed communications system (DCS).

Wireless communication is rapidly growing, with ever-increasing demands for high-speed mobile data communication. As an example, local area wireless services (e.g., so-called "Wi-Fi" systems) and wide area wireless services are being deployed in many different types of areas (e.g., coffee shops, airports, libraries, etc.). Communications systems have been provided to transmit and/or distribute communications signals to wireless nodes called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a 5G and/or a 5G-NR communications system. In this regard, the radio node 102 can function as a 5G or 5G-NR base station (a.k.a. eNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, it is desirable to radiate the RF beams 120(1)-120(N) based on a desirable number of RF beams to help mitigate signal propagation loss and/or interference.

SUMMARY

Embodiments disclosed herein include beamforming codebook synthesis in a wireless communications system (WCS). In a WCS, a wireless node (e.g., base station) emits one after another (e.g., serially) multiple reference beams in a coverage area based on a set of codewords that is optimized for a specific number (a full or a partial set) of antenna elements in an antenna array. Under certain operating conditions (e.g., for heat and/or power control), the wireless node may need to emit the reference beams using a different number of the antenna elements in the antenna array. We refer to the selection of used antenna elements as "antenna array configuration". In this regard, in embodiments disclosed herein, the wireless node is configured to determine a different set(s) of codewords that is fine tuned for forming an identical number of the reference beams from a different number of the antenna elements in the antenna array and radiate reference beams having identical radiation pattern despite operating with different antenna array configuration. In addition, the wireless node can dynamically select an appropriate set of codewords in response to different operating conditions. By determining and dynamically selecting different sets of codewords for forming the reference beams, it is possible to switch transparently, from both wireless node and end user perspectives, between different antenna array configurations under different operating conditions of the wireless node.

One exemplary embodiment of the disclosure relates to a wireless node. The wireless node includes an antenna array. The antenna array includes a plurality of antenna elements. The antenna array is configured to emit a predetermined number of radio frequency (RF) beams in a coverage area. The wireless node also includes a codeword synthesis circuit. The codeword synthesis circuit is configured to partition the coverage area into a plurality of coverage clusters each configured to receive a respective one of the predetermined number of RF beams. The codeword synthesis circuit is also configured to determine at least one synthesized codebook among a plurality of beamforming codebooks that includes a plurality of synthesized codewords for forming the predetermined number of RF beams, respectively, using a selected number of the plurality of antenna elements. The codeword synthesis circuit is also configured to determine an optimized codebook among the plurality of beamforming codebooks that includes a plurality of optimized codewords for forming the predetermined number of RF beams, respectively, using an optimized number of the plurality of antenna elements. The codeword synthesis circuit is also configured to optimize each of the plurality of synthesized codewords in the at least one synthesized codebook based on a respective one of the plurality of optimized codewords in the optimized codebook to provide reference signals for whole coverage area when each reference beam is covering part/cluster of the whole area.

An additional exemplary embodiment of the disclosure relates to a method for synthesizing a codebook for RF beamforming in a WCS. The method includes partitioning a coverage area into a plurality of coverage clusters each configured to receive a respective one of a predetermined number of RF beams. The method also includes determining at least one synthesized codebook among a plurality of beamforming codebooks that includes a plurality of synthesized codewords for forming the predetermined number of RF beams, respectively, using a selected number of a plurality of antenna elements. The method also includes determining an optimized codebook among the plurality of beamforming codebooks that includes a plurality of optimized codewords for forming the predetermined number of RF beams, respectively, using an optimized number of the plurality of antenna elements. The method also includes optimizing each of the plurality of synthesized codewords in the at least one synthesized codebook based on a respective one of the plurality of optimized codewords in the optimized codebook to provide reference signals for whole coverage area when each reference beam is covering part/cluster of the whole area.

An additional exemplary embodiment of the disclosure relates to a WCS. The WCS includes a centralized services node coupled to a service node. The WCS also includes at least one wireless node coupled to the centralized services node. The at least one wireless node includes an antenna array. The antenna array includes a plurality of antenna elements. The antenna array is configured to emit a predetermined number of RF beams in a coverage area. The at least one wireless node also includes a codeword synthesis circuit. The codeword synthesis circuit is configured to partition the coverage area into a plurality of coverage clusters each configured to receive a respective one of the predetermined number of RF beams. The codeword synthesis circuit is also configured to determine at least one synthesized codebook among a plurality of beamforming codebooks that includes a plurality of synthesized codewords for forming the predetermined number of RF beams, respectively, using a selected number of the plurality of antenna elements. The codeword synthesis circuit is also configured to determine an optimized codebook among the plurality of beamforming codebooks that includes a plurality of optimized codewords for forming the predetermined number of RF beams, respectively, using an optimized number of the plurality of antenna elements. The codeword synthesis circuit is also configured to optimize each of the plurality of synthesized codewords in the at least one synthesized codebook based on a respective one of the plurality of optimized codewords in the optimized codebook.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include beamforming codebook synthesis in a wireless communications system (WCS). In a WCS, a wireless node (e.g., base station) simultaneously emits multiple reference beams in a coverage area based on a set of codewords that is optimized for a specific number (a full or a partial set) of antenna elements in an antenna array. Under certain operating conditions (e.g., for heat and/or power control), the wireless node may need to emit the reference beams using a different number of the antenna elements in the antenna array. In this regard, in embodiments disclosed herein, the wireless node is configured to determine a different set(s) of codewords that is fine tuned for forming an identical number of the reference beams from a different number of the antenna elements in the antenna array and steer the reference beams toward identical directions. In addition, the wireless node can dynamically select an appropriate set of codewords in response to different operating conditions. By determining and dynamically selecting different sets of codewords for forming the reference beams, it is possible to switch transparently, from both wireless node and end user perspectives, between different antenna array configurations under different operating conditions of the wireless node.

Figure 1:
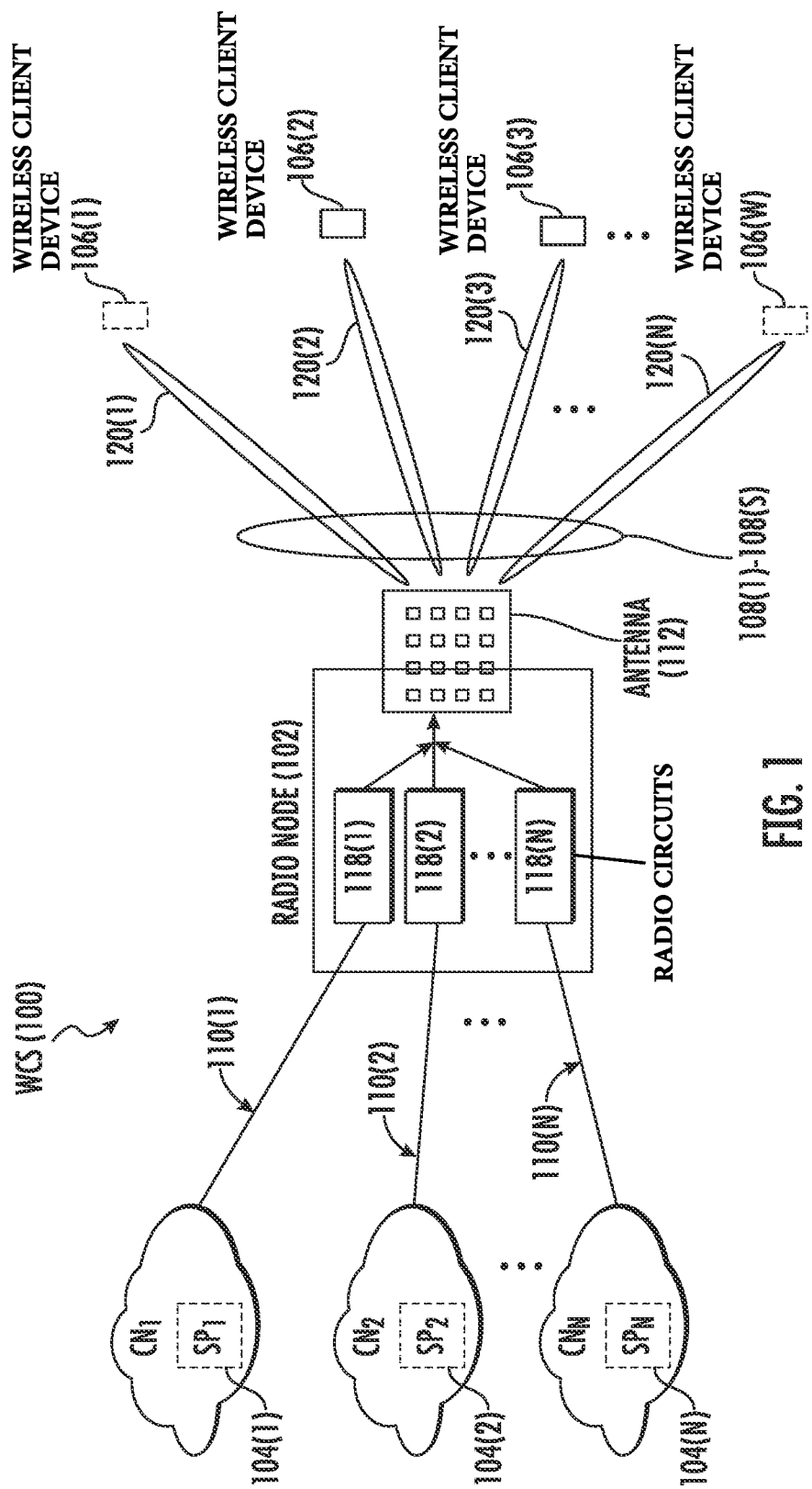
FIG. 1 is a schematic diagram of an exemplary wireless communications system (WCS), such as a distributed communications system (DCS), configured to distribute communications services to remote coverage areas.
Figures 2A, 2B:
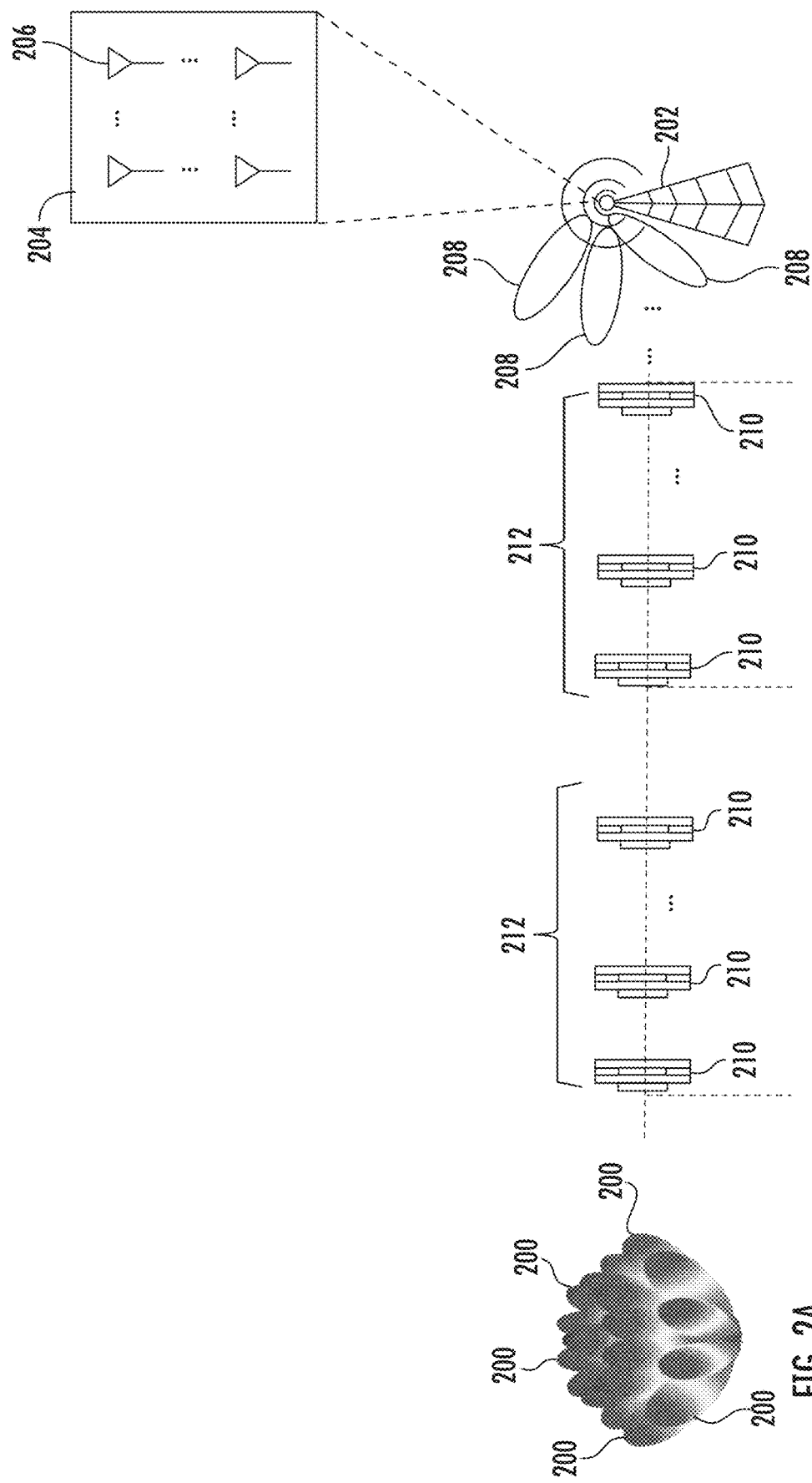
FIGS. 2A-2B are graphic diagrams providing exemplary illustrations of a number of fundamental aspects related to radio frequency (RF) beamforming.
Figure 3:
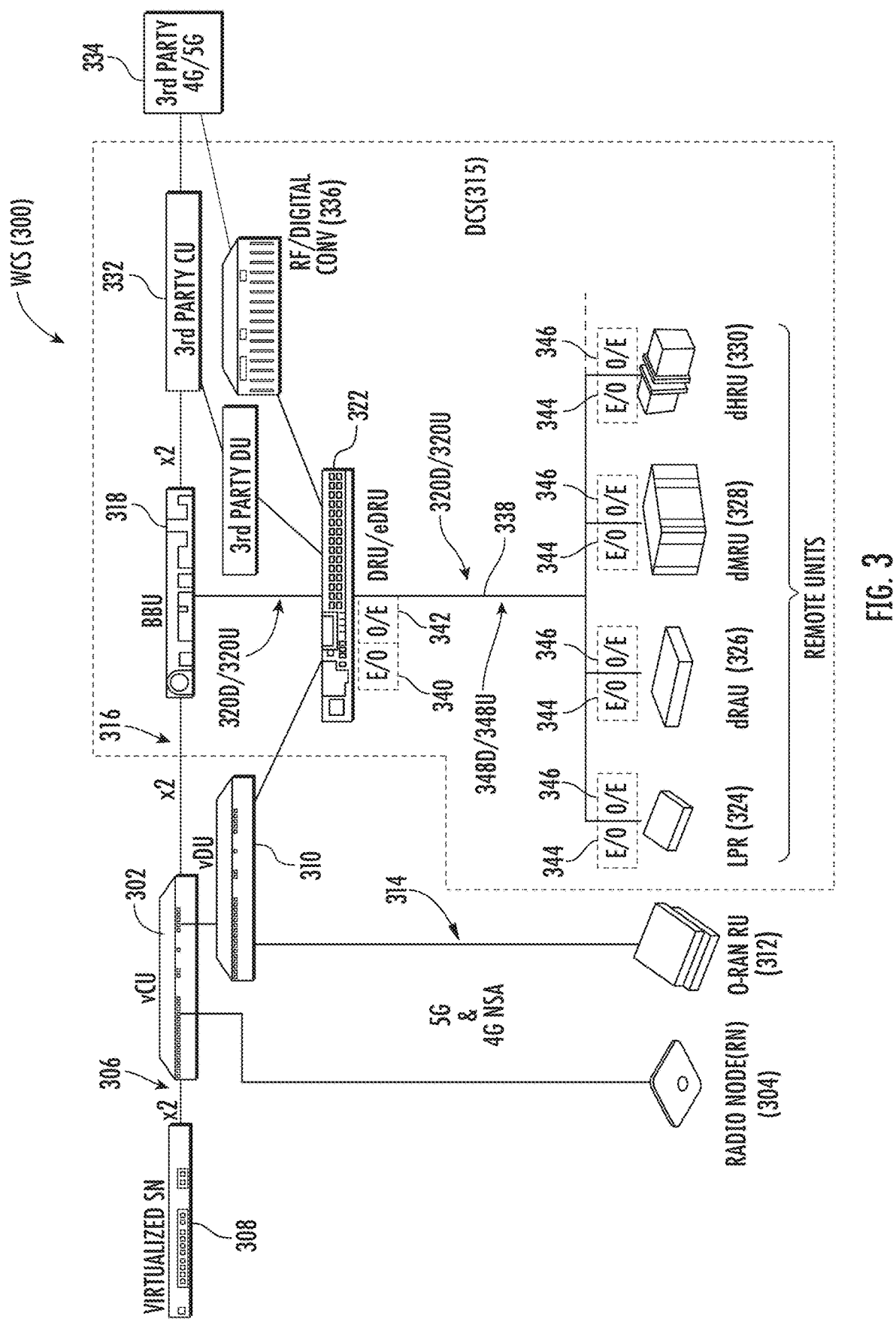
FIG. 3 is a schematic diagram of an exemplary WCS configured according to any of the embodiments disclosed herein to enable beamforming codebook synthesis and support dynamic beamforming codebook switching in various wireless nodes.

Before discussing a wireless node of the present disclosure configured to synthesize a beamforming codebook(s), starting at FIG. 3, a brief overview of a conventional beamforming system is first provided with reference to FIGS. 2A-2B to help explain some fundamental aspects related to radio frequency (RF) beamforming.

In this regard, FIGS. 2A-2B are graphic diagrams providing exemplary illustrations of fundamental aspects related to RF beamforming. In general, beamforming refers to a technique that uses multiple antenna elements to simultaneously emit an RF signal. The antenna elements are typically organized into an antenna array (e.g., 4×4, 8×8, 16×16, etc.) and separated from each other by a distance (e.g., ½ wavelength). The RF signal emitted from the antenna elements is preprocessed based on a set of complex-valued coefficients, which is commonly known as a codeword. Specifically, the codeword is physically realized through phase and/or amplitude control applied at input of the antenna elements to thereby maximize array gain in a specific direction. By applying the set of complex-valued coefficients to the RF signal, the multiple simultaneously emitted RF signals can form a radiation pattern (a.k.a. RF beam) described by gain, intensity, power, and/or electric/magnetic field values versus elevation and azimuth directions. In this regard, it can be said that each RF beam is associated with, or defined by, a respective codeword. In other words, there is a one-to-one relationship between an RF beam and a codeword for specific/fixed antenna array configuration. Accordingly, a list of different codewords, often referred to as a codebook, can define multiple different RF beams. As illustrated in FIG. 2A, by pre-processing the RF signal based on different codewords, it may be possible to form multiple RF beams 200 pointing to multiple directions to be transmitted at different time slots, but not simultaneously.

Notably, the radiation pattern often includes a main lobe, where the radiation power is concentrated and close to a maximum radiated power, and one or more side lobes with lesser amounts of radiated power. Typically, a radiation direction of the main lobe determines a radiation direction of the RF beam, and a beamwidth of the RF beam is defined by a set of radiation directions of the radiation pattern wherein a radiated power is not lower than 3 dB from the maximum radiated power.

In the context of the present disclosure, the RF beams 200 are known as synchronization signals beams or reference beams that enable a user device to discover a transmitting base station. Although, in theory, it is possible to increase the number of the RF beams 200 by defining more codewords, an actual number of the RF beams 200 is typically limited by a standard-defined parameter known as the synchronization signal block (SSB). FIG. 2B is a graphic diagram providing an exemplary illustration of how the SSB limits the actual number of the RF beams 200 that may be formed by a wireless node 202 (e.g., gNB) configured to operate according to the third-generation partnership project (3GPP) standard.

As shown in FIG. 2B, the wireless node 202 includes an antenna array 204 having multiple antenna elements 206. To allow any user equipment (UE) in an intended coverage area to detect the wireless node 202, the wireless node 202 is configured to periodically radiate multiple reference beams 208 (a.k.a. synchronization signals beams) in different directions of the intended coverage cell. Like the RF beam 200, each of the reference beams 208 is formed based on a respective codeword as described above. The reference beams 208 are each associated with a respective one of multiple SSBs 210. Each of the SSBs 210 may include such information as a primary synchronization signal (PSS), a secondary synchronization signal (SSS), and a 5G-NR physical broadcast channel (PBCH) to enable the UE to discover the wireless node 202.

According to a conventional beamforming approach, the wireless node 202 is configured to sequentially steer the reference beams 208 toward different directions, which is often predetermined in the codewords, in the coverage area. Accordingly, a UE can sweep through the reference beams 208 to identify a candidate reference beam(s) associated with a strongest reference signal received power (RSRP). Further, the UE may decode a candidate SSB(s) associated with the identified candidate reference beam(s) to acquire such information as physical cell identification (PCI) and a PBCH demodulation reference signal (DMRS). Based on the candidate reference beam(s) reported by the UE, the wireless node 202 may pinpoint a location of the UE and subsequently steer a data-bearing RF beam toward the UE to enable data communication with the UE. The SSBs 210 may be organized into an SSB burst set 212 to be repeated periodically based on a predefined SSB burst interval. The current 3GPP standard allows a maximum of 64 SSBs to be scheduled in the SSB burst set 212. Accordingly, the wireless node 202 can radiate up to 64 reference beams 208 during each SSB burst interval.

In one non-limiting example, under a normal operating condition, the wireless node 202 may be configured to emit a predetermined number of the reference beams 208 using all the antenna elements 206 in the antenna array 204 (e.g., all 64 antenna elements in an 8×8 antenna array). As such, the wireless node 202 will use a set of codewords (a.k.a. optimized codewords) that is optimized for all the antenna elements 206 in the antenna array 204 to form the predetermined number of the reference beams 208. However, under some abnormal conditions (e.g., overheating), the wireless node 202 may be forced to switch to forming the predetermined number of the reference beams 208 using a subset of the antenna elements 206 in the antenna array 204 (e.g., 32 antenna elements in the 8×8 antenna array). In this regard, if the wireless node 202 uses the set of optimized codewords to form the predetermined number of the reference beams 208, the reference beams 208 may be altered in terms of gain, intensity, power, and/or electric/magnetic field values to potentially affect coverage pattern in an intended coverage area.

In another non-limiting example, under the normal operating condition, the wireless node 202 may be configured to emit the predetermined number of the reference beams 208 using a subset of the antenna elements 206 in the antenna array 204 (e.g., 32 out of 64 antenna elements in an 8×8 antenna array). As such, the wireless node 202 will use a set of codewords (a.k.a. optimized codewords) that is optimized for the subset of the antenna elements 206 in the antenna array 204 to form the predetermined number of the reference beams 208. However, under some special conditions (e.g., low signal to noise ratio or low signal to interference and noise ratio), the wireless node 202 may switch to forming the predetermined number of reference beams 208 using all the antenna elements 206 in the antenna array 204. If the wireless node 202 uses the set of optimized codewords to form the predetermined number of the reference beams 208, the reference beams 208 may be altered in terms of gain, intensity, power, and/or electric/magnetic field values to potentially affect coverage pattern in an intended coverage area.

In this regard, regardless of whether the wireless node 202 is configured to form the predetermined number of the reference beams 208 using all or a subset of the antenna elements 206 in the antenna array 204 under the normal operating condition, it is desirable for the wireless node 202 to use a synthesized set of codewords dedicated to form the predetermined number of the reference beams 208 under the abnormal/special conditions. More importantly, the dedicated set of codewords, which may be different from the set of optimized codewords used under the normal operating condition, shall be so determined to ensure that each of the predetermined number of reference beams 208 can be formed with substantial similarity (in terms of gain, intensity, power, and/or electric/magnetic field values) to a respective one of the predetermined number of reference beams 208 formed with the set of optimized codewords such that switching between all and the subset of the antenna elements 206 can be performed transparently from perspectives of the wireless node 202 and/or end users on the receiving end of the predetermined number of reference beams 208.

For the convenience of reference, a pair of the reference beams 208 associated with a same beam identification (ID) but formed with different sets of the codewords is referred to as "related beams" hereinafter. For example, a respective one of the reference beams 208 associated with beam ID #1 but formed with all the antenna elements 206 using a respective one of the optimized set of codewords is a "related beam" to a respective one of the reference beams 208 associated with beam ID #1 but formed with a subset of the antenna elements 206 using a respective one of the synthesized set of codewords. Similarly, a respective one of the reference beams 208 associated with beam ID #1 but formed with a subset of the antenna elements 206 using a respective one of the optimized set of codewords is a "related beam" to a respective one of the reference beams 208 associated with beam ID #1 but formed with all the antenna elements 206 using a respective one of the synthesized set of codewords.

FIG. 3 is a schematic diagram of an exemplary WCS 300 configured according to any of the embodiments disclosed herein to enable beamforming codebook synthesis and support dynamic beamforming codebook switching in various wireless nodes. The WCS 300 supports both legacy 4G LTE, 4G/5G non-standalone (NSA), and 5G standalone communications systems. As shown in FIG. 3, a centralized services node 302 is provided and is configured to interface with a core network to exchange communications data and distribute the communications data as radio signals to various wireless nodes. In this example, the centralized services node 302 is configured to support distributed communications services to a radio node 304 (e.g., 5G or 5G-NR gNB). Despite that only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In context of the present disclosure, a wireless node refers generally to a wireless communication circuit including at least a processing circuit, a memory circuit, and an antenna circuit, and can be configured to process, transmit, and receive a wireless communications signal. In this regard, any of the radio node 304, the O-RAN RN 312, the LPR 324, the dRAU 326, the dMRU 328, and the dHRU 330 can function as a wireless node, as discussed with more details in FIG. 4, to enable beamforming codebook synthesis and support dynamic beamforming codebook switching based on embodiments disclosed herein.

Figure 4:
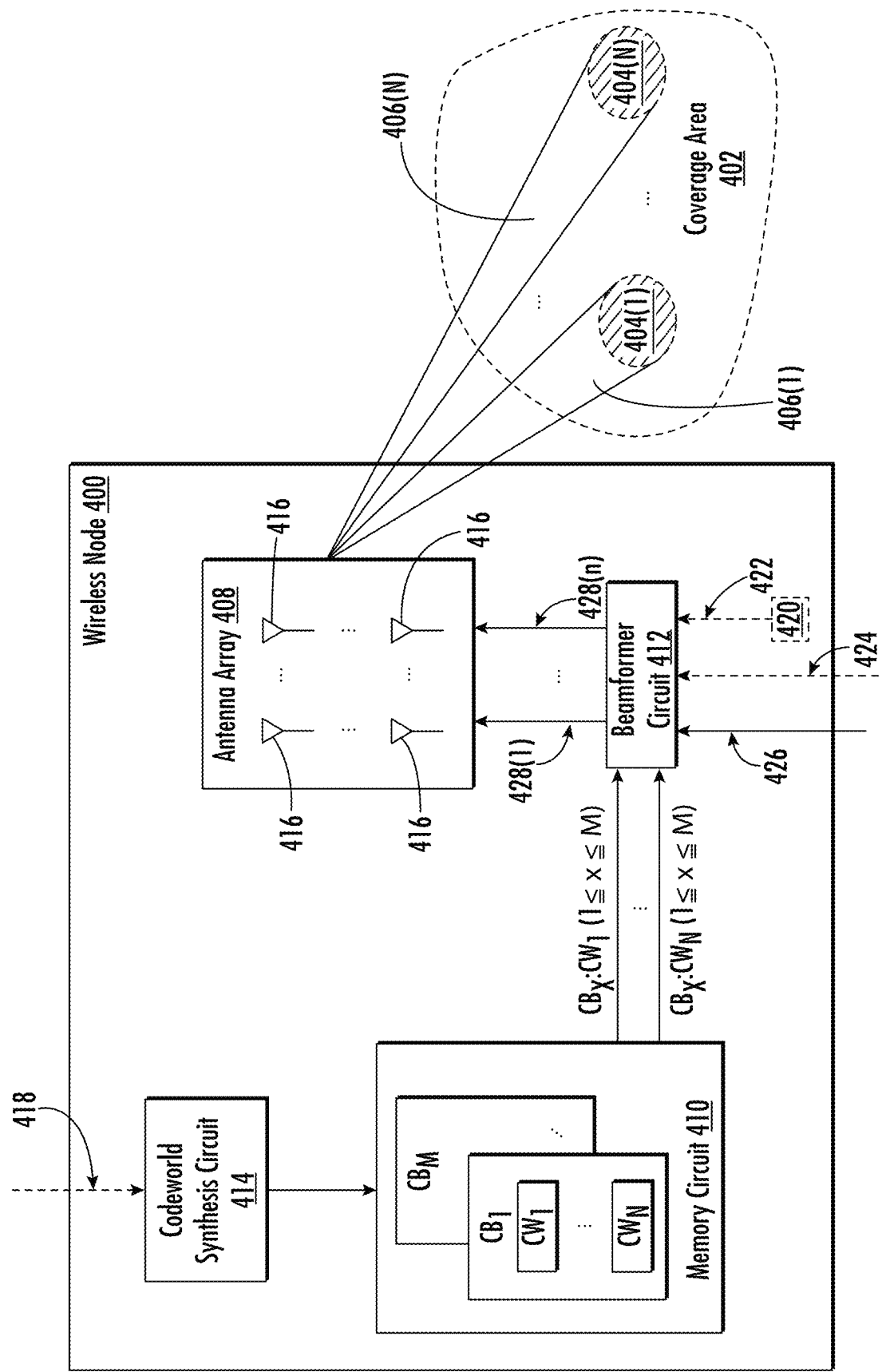
FIG. 4 is a schematic diagram of an exemplary wireless node, which can be provided in the WCS of FIG. 3 to enable beamforming codebook synthesis and support dynamic beamforming codebook switching in a coverage area.

FIG. 4 is a schematic diagram of an exemplary wireless node 400 that can be configured according to various embodiments of the present disclosure to enable beamforming codebook synthesis and support dynamic beamforming codebook switching in a coverage area 402. More specifically, the coverage area 402 can be divided into a plurality of coverage clusters 404(1)-404(N) and the wireless node 400 is configured to emit a predetermined number of RF beams 406(1)-406(N) (e.g., the reference beams 208 in FIG. 2B) toward the coverage clusters 404(1)-404(N), respectively.

In an embodiment, the wireless node 400 includes an antenna array 408, a memory circuit 410, a beamformer circuit 412, and a codeword synthesis circuit 414. The antenna array 408 includes a plurality of antenna elements 416. Notably, the antenna elements 416 can be any type of radiating structures.

The memory circuit 410, which may be a solid-state disc (SSD), flash memory, as an example, is configured to store a plurality of beamforming codebooks $CB_1$-$CB_M$. Each of the beamforming codebooks $CB_1$-$CB_M$ includes a predetermined number of codewords $CW_1$-$CW_N$ each determined to form a respective one of the RF beams 406(1)-406(N). Notably, one of the codebooks $CB_1$-$CB_M$ is referred to as "an optimized codebook," while all other ones of the beamforming codebooks $CB_1$-$CB_M$ are referred to as "synthesized codebooks." In context of the present disclosure, the "optimized codebook," which includes a respective set of optimized codewords $CW_1$-$CW_N$, is optimized for forming the RF beams 406(1)-406(M) using either all the antenna elements 416 or a subset of the antenna elements 416 under the normal operating conditions as discussed above in FIG. 2B. In contrast, the "synthesized codebook," which includes a respective set of synthesized codewords $CW_1$-$CW_N$, is generated for forming the RF beams 406(1)-406(M) using either a subset of the antenna elements 416 or all the antenna elements 416 under the abnormal/special conditions as discussed above in FIG. 2B.

As discussed in detail below, each of the synthesized codewords $CW_1$-$CW_N$ in a synthesized codebook among the beamforming codebooks $CB_1$-$CB_M$ can be optimized based on a respective one of the optimized codewords $CW_1$-$CW_N$ in the optimized codebook among the beamforming codebooks $CB_1$-$CB_M$ to ensure that each pair of "related beams" can be formed with substantial similarity in terms of gain, intensity, power, and/or electric/magnetic field values. As such, the wireless node 400 can dynamically switch between the optimized codebook and the synthesized codebook without impacting the RF beams 406(1)-406(M) formed thereby.

Figure 5:
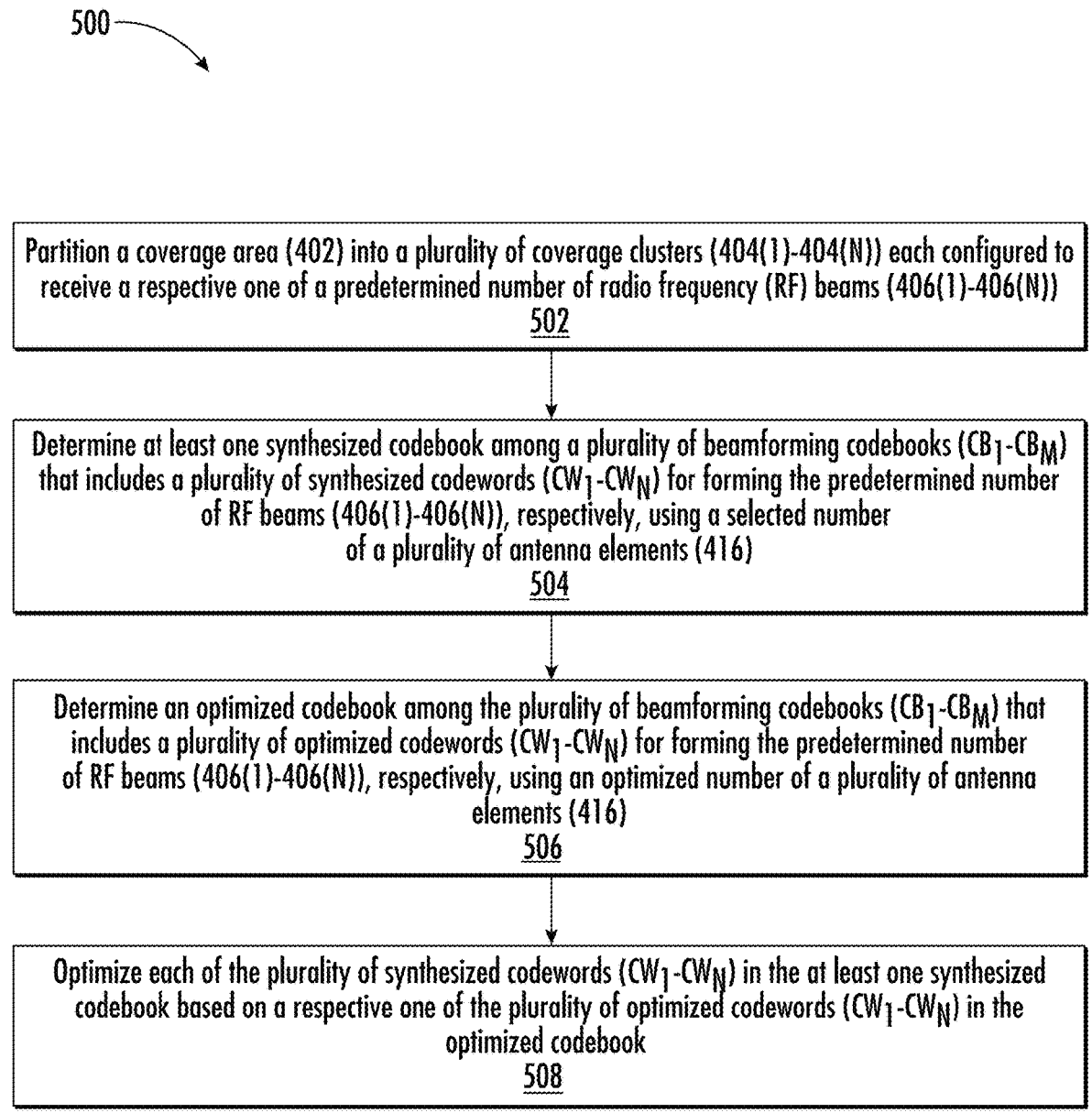
FIG. 5 is a flowchart of an exemplary process that can be employed by the wireless node of FIG. 4 to determine a set of beamforming codebooks.

According to an embodiment of the present disclosure, the codeword synthesis circuit 414 can be configured to determine the beamforming codebooks $CB_1$-$CB_M$ according to a process. In this regard, FIG. 5 is a flowchart of an exemplary process 500 that may be employed by the codeword synthesis circuit 414 in the wireless node 400 of FIG. 4 to determine the beamforming codebooks $CB_1$-$CB_M$.

Herein, the codeword synthesis circuit 414 is configured to divide the coverage area 402 into the coverage clusters 404(1)-404(N) each configured to receive a respective one of the predetermined number of RF beams 406(1)-406(N) (block 502). Next, the codeword synthesis circuit 414 is configured to determine at least one synthesized codebook among the beamforming codebooks $CB_1$-$CB_M$ that includes a plurality of synthesized codewords $CW_1$-$CW_N$ for forming the predetermined number of RF beams 406(1)-406(N) using a selected number of the antenna elements 416 (block 504). The codeword synthesis circuit 414 is also configured to determine an optimized codebook among the beamforming codebooks $CB_1$-$CB_M$ that includes a plurality of optimized codewords $CW_1$-$CW_N$ for forming the predetermined number of RF beams 406(1)-406(N) using an optimized number of the antenna elements 416 (block 506). Notably, the codeword synthesis circuit 414 may be configured to determine the synthesized codebook and the optimized codebook either sequentially or concurrently. In one embodiment, the optimized number of the antenna elements 416 refers to all the antenna elements 416 and the selected number of the antenna elements 416 refers to a subset of the antenna elements 416. In an alternative embodiment, the optimized number of the antenna elements 416 refers to a subset of the antenna elements 416 and the selected number of the antenna elements 416 refers to all the antenna elements 416. After determining the synthesized codebook and the optimized codebook, the codeword synthesis circuit 414 is further configured to optimize each of the synthesized codewords $CW_1$-$CW_N$ in the synthesized codebook based on a respective one of the optimized codewords $CW_1$-$CW_N$ in the optimized codebook (block 508). As further discussed below, the codeword synthesis circuit 414 may do so by comparing a respective matching quality between each pair of "related beams" formed based on a respective one of the synthesized codewords $CW_1$-$CW_N$ and a respective one of the optimized codewords $CW_1$-$CW_N$.

Figure 6:
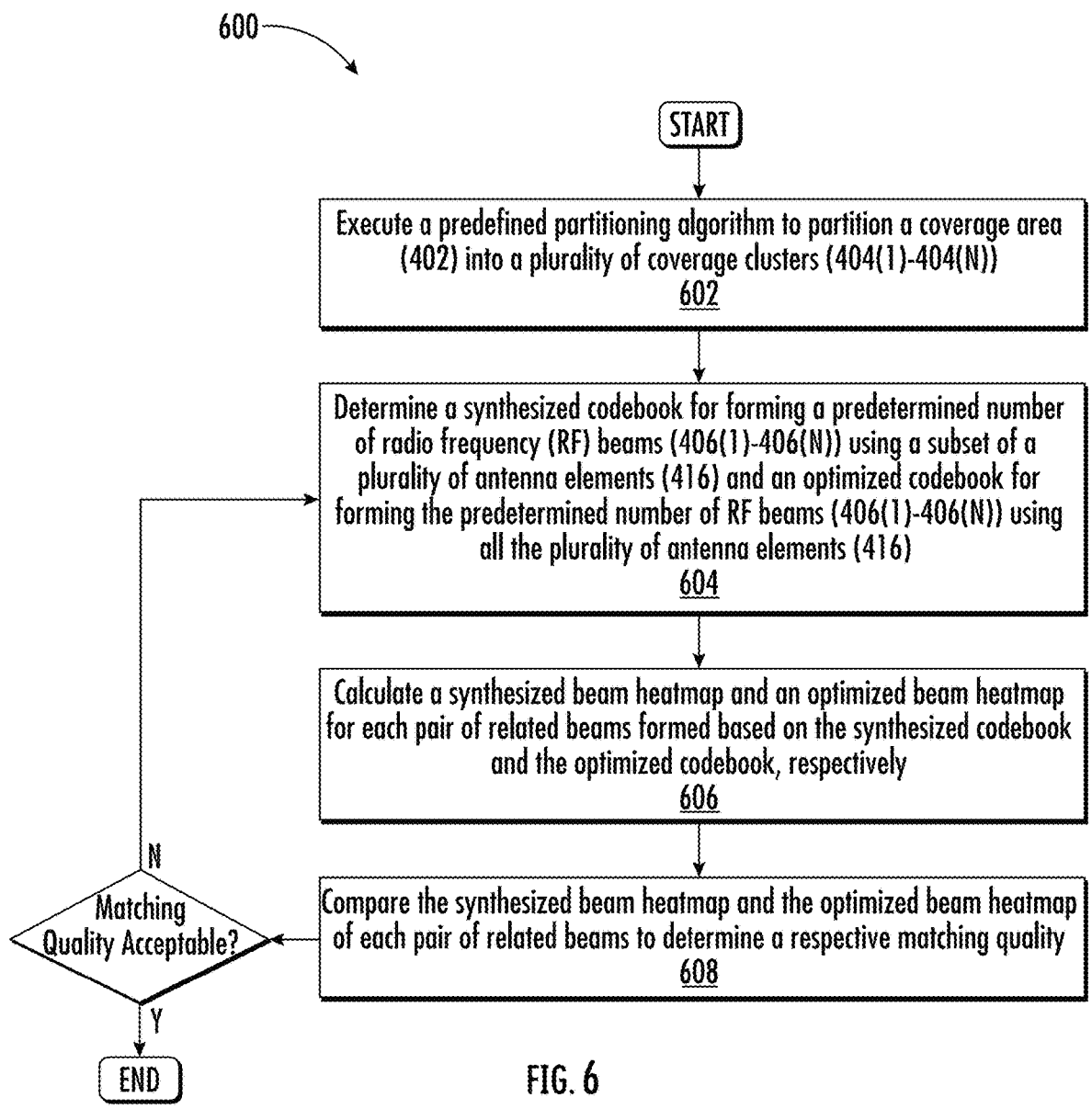
FIG. 6 is a flowchart of an exemplary process that may be employed by the wireless node of FIG. 4 to determine the beamforming codebooks based on an automatic partitioning of the coverage area.

With reference back to FIG. 4, in one embodiment, the codeword synthesis circuit 414 can be configured to execute a predefined partitioning algorithm to automatically divide the coverage area 402 into the coverage clusters 404(1)-404(N). In this regard, FIG. 6 is a flowchart of an exemplary process 600 that may be employed by the codeword synthesis circuit 414 in the wireless node 400 of FIG. 4 to determine the beamforming codebooks $CB_1$-$CB_M$ based on an automatic partitioning of the coverage area 402.

Herein, the codeword synthesis circuit 414 is configured to execute a predefined partitioning algorithm to partition the coverage area 402 into the coverage clusters 404(1)-404(N) (block 602). In an embodiment, the codeword synthesis circuit 414 may be configured to execute the predefined partitioning algorithm as described in detail in U.S. patent application Ser. No. 17/890,343, entitled "COVERAGE CLUSTER-BASED BEAMFORMING IN A WIRELESS NODE IN A WIRELESS COMMUNICATIONS SYSTEM (WCS)." Alternatively, as another example, codeword synthesis could be performed by a pre-processing procedure (or such could be performed on another machine off-line) to partition the coverage area based on antenna array configuration and deployment geometry of area to be covered for the RF beams 406(1)-406(N).

The codeword synthesis circuit 414 is also configured to determine the synthesized codebook for forming the predetermined number of RF beams 406(1)-406(N) using a subset of the antenna elements 416 and an optimized codebook for forming the predetermined number of RF beams 406(1)-406(N) using all the antenna elements 416 (block 604). In one embodiment, the codeword synthesis circuit 414 may determine the synthesized codebook and/or the optimized codebook based on a procedure as described in detail in U.S. patent application Ser. No. 17/828,171, entitled "MULTI-BEAM UNIFORM COVERAGE IN A COVERAGE CELL(S) IN A WIRELESS COMMUNICATIONS SYSTEM (WCS)." Alternatively, the codeword synthesis circuit 414 may determine the synthesized codebook and/or the optimized codebook based on a procedure as described in an upcoming IEEE publication, entitled "BEAMFORMING SYNTHESIS FOR INITIAL ACCESS FAIRNESS IN WIRELESS NETWORKS."

The codeword synthesis circuit 414 is also configured to calculate a synthesized beam heatmap and an optimized beam heatmap for each pair of "related beams" formed based on the synthesized codebook and the optimized codebook, respectively (block 606). The codeword synthesis circuit 414 is also configured to compare the synthesized beam heatmap and the optimized beam heatmap of each pair of "related beams" to determine a respective matching quality (block 608). If the respective matching quality of any pair of "related beams" does not meet a predefined threshold, the codeword synthesis circuit 414 will return to block 604. Otherwise, the process 600 will end.

Figure 7:
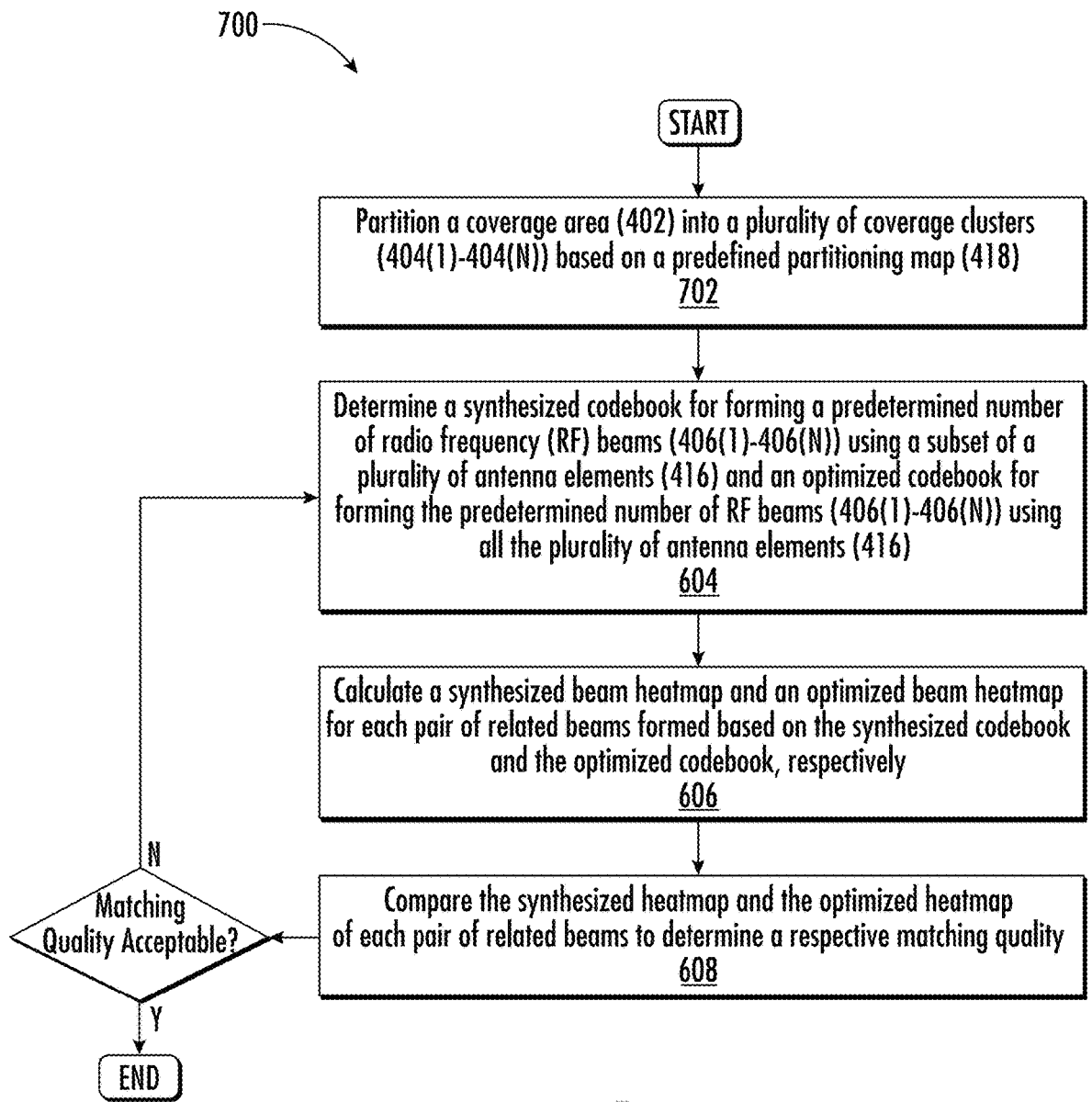
FIG. 7 is a flowchart of an exemplary process that may be employed by the wireless node of FIG. 4 to determine the beamforming codebooks based on a manual partitioning of the coverage area.

With reference back to FIG. 4, in an alternative embodiment, the codeword synthesis circuit 414 may receive a predefined partitioning map 418 that is determined manually outside the wireless node 400. In this regard, FIG. 7 is a flowchart of an exemplary process 700 that may be employed by the codeword synthesis circuit 414 in the wireless node 400 of FIG. 4 to determine the beamforming codebooks $CB_1$-$CB_M$ based on a manual partitioning of the coverage area 402. Common elements between FIGS. 6 and 7 are shown therein with common element numbers and will not be re-described herein.

According to the process 700, the codeword synthesis circuit 414 is configured to partition the coverage area 402 into the coverage clusters 404(1)-404(N) based on the predefined partitioning map 418 (block 702). In a non-limiting example, the predefined partitioning map 418 can be a computer-generated partitioning map based on manually collected/inputted partitioning data.

With reference back to FIG. 4, the beamformer circuit 412 is configured to dynamically select a beamforming codebook $CB_X$ among the beamforming codebooks $CB_1$-$CB_M$. The beamformer circuit 412 is also configured to process an RF signal 426 based on the codewords $CW_1$-$CW_N$ in the selected beamforming codebook $CB_X$ to generate a plurality of beamforming RF signals 428(1)-428(N).

In a non-limiting example, the wireless node 400 can include a temperature sensor 420 configured to generate an indication signal 422 in response to detecting an overheating condition. Accordingly, the beamformer circuit 412 may select the beamforming codebook $CB_X$ that is optimized for forming the RF beams 406(1)-406(N) using a selected subset of the antenna elements 416. In this regard, the beamformer circuit 412 will provide the beamforming RF signals 428(1)-428(N) to the selected subset of the antenna elements 416 in the antenna array 408.

In another non-limiting example, the beamformer circuit 412 may receive a configuration signal 424 instructing the beamformer circuit 412 to rachet up gain/power of the RF beams 406(1)-406(N). Accordingly, the beamformer circuit 412 may select the beamforming codebook $CB_X$ that is optimized for forming the RF beams 406(1)-406(N) using all the antenna elements 416. In this regard, the beamformer circuit 412 will provide the beamforming RF signals 428(1)-428(N) to all the antenna elements 416 in the antenna array 408.

Figure 8:
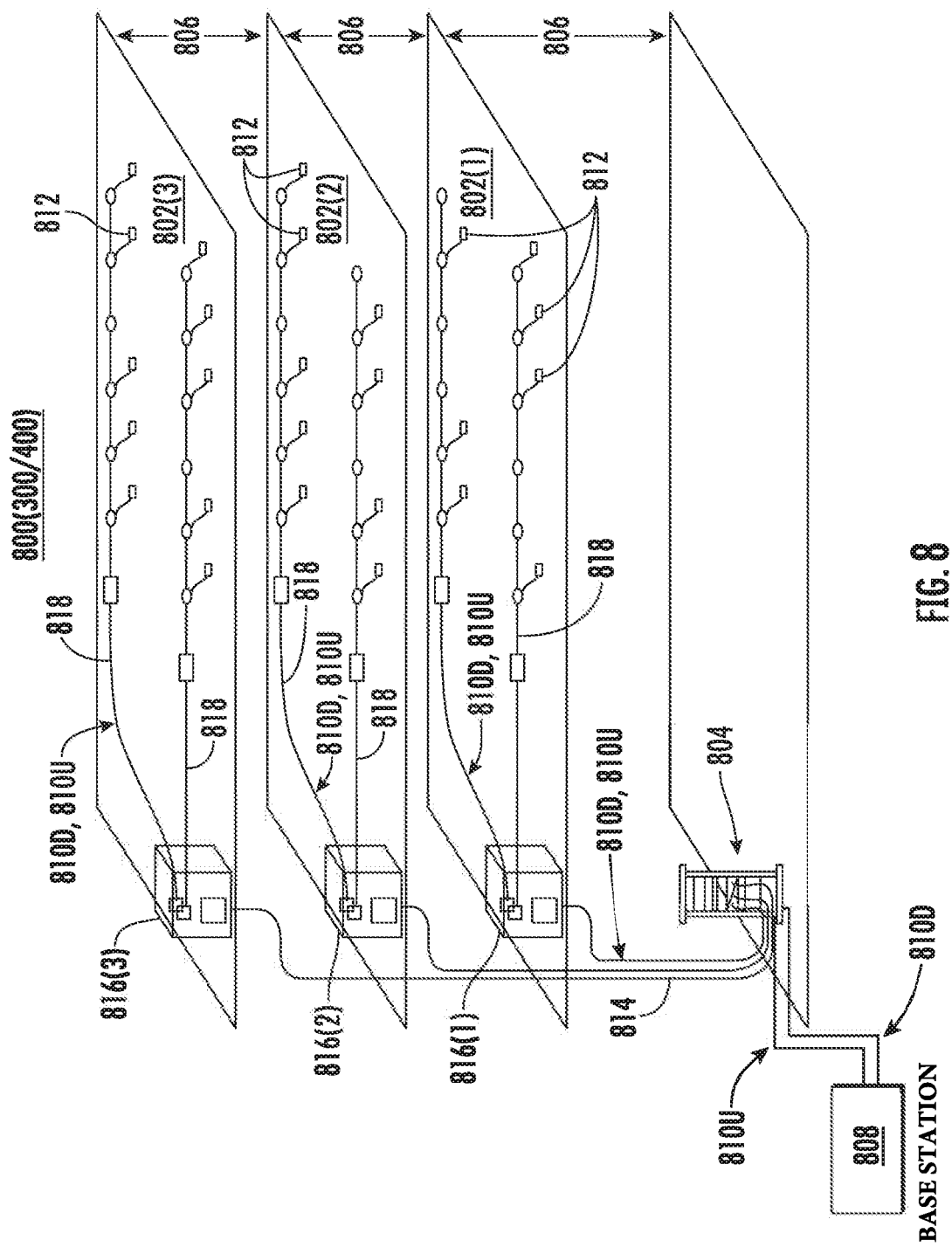
FIG. 8 is a partial schematic cut-away diagram of an exemplary building infrastructure in a WCS, such as the WCS of FIG. 3 that includes the wireless node of FIG. 4 to enable beamforming codebook synthesis and support dynamic beamforming codebook switching.

The WCS 300 of FIG. 3, which can include the wireless node 400 in FIG. 4, can be provided in an indoor environment as illustrated in FIG. 8. FIG. 8 is a partial schematic cut-away diagram of an exemplary building infrastructure 800 in a WCS, such as the WCS 300 of FIG. 3 that includes the wireless node 400 of FIG. 4 to enable beamforming codebook synthesis and support dynamic beamforming codebook switching. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
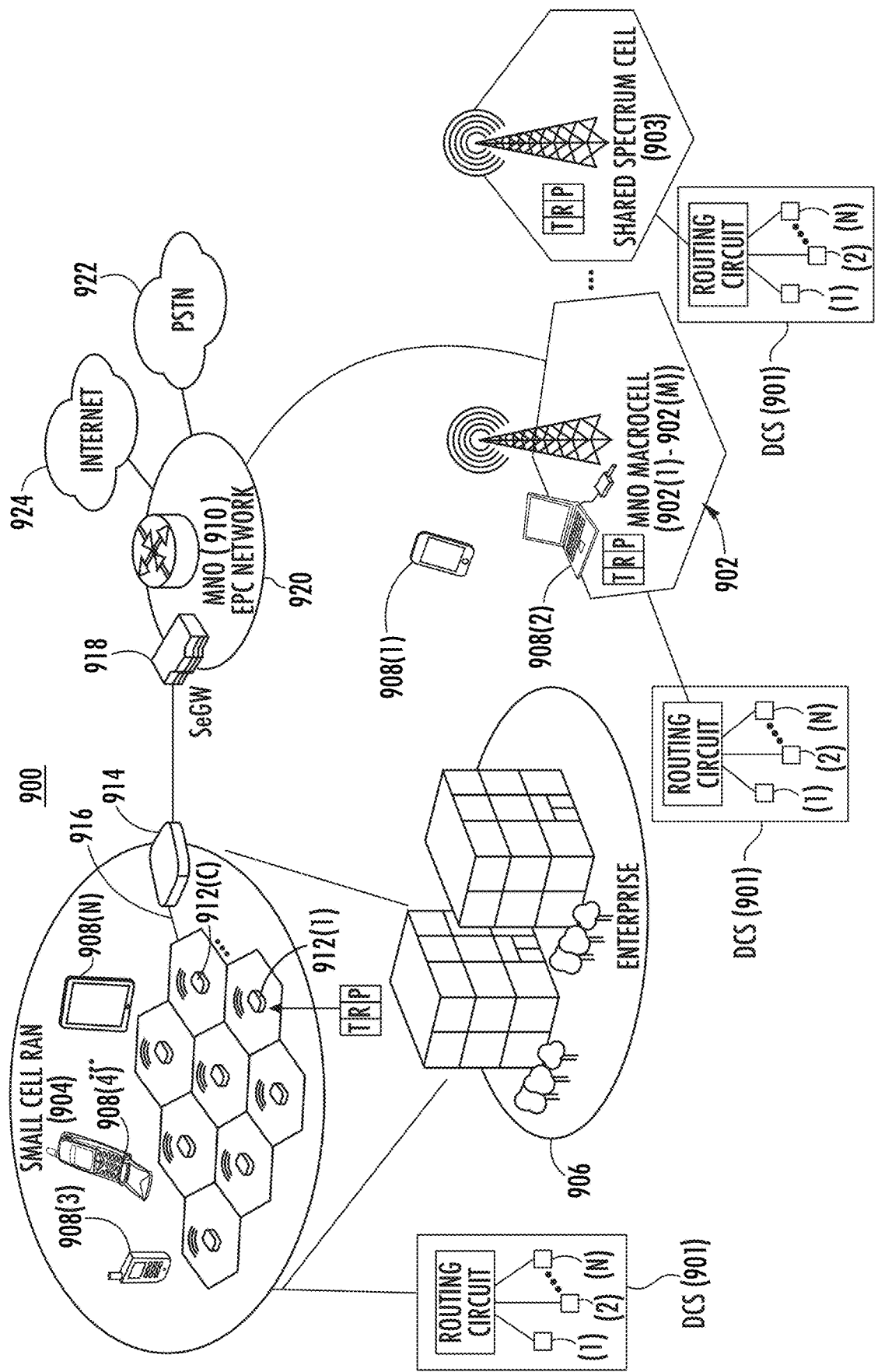
FIG. 9 is a schematic diagram of an exemplary mobile telecommunications environment that can includes the WCS of FIG. 3 that includes the wireless node of FIG. 4 to enable beamforming codebook synthesis and support dynamic beamforming codebook switching.

The WCS 300 of FIG. 3 and the wireless node 400 of FIG. 4, configured to enable beamforming codebook synthesis and support dynamic beamforming codebook switching, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 300 of FIG. 3 that includes the wireless node 400 of FIG. 4, as an example.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
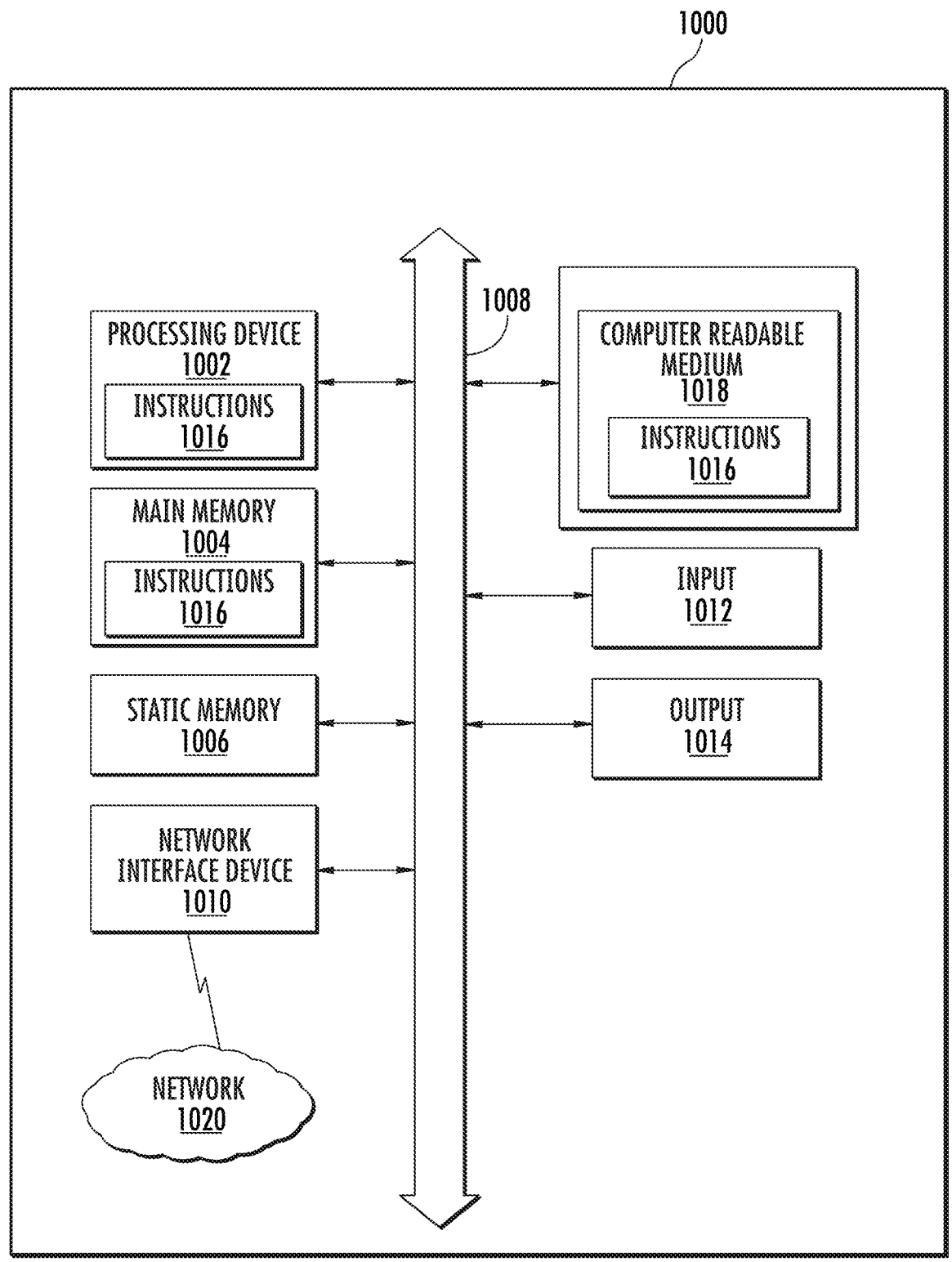
FIG. 10 is a schematic diagram of a representation of an exemplary computer system that can be included in or interfaced with any of the components in the WCS of FIG. 3 and the wireless node in FIG. 4 to enable beamforming codebook synthesis and support dynamic beamforming codebook switching, wherein the exemplary computer system is configured to execute instructions from an exemplary computer-readable medium.

Any of the circuits in the WCS 300 of FIG. 3 and the wireless node 400 of FIG. 4, such as the codeword synthesis circuit 414 and/or the beamformer circuit 412, can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless node, comprising:
an antenna array comprising a plurality of antenna elements and configured to emit a predetermined number of radio frequency (RF) beams in a coverage area; and
a codeword synthesis circuit configured to:
partition the coverage area into a plurality of coverage clusters each configured to receive a respective one of the predetermined number of RF beams;
determine at least one synthesized codebook among a plurality of beamforming codebooks that includes a plurality of synthesized codewords for forming the predetermined number of RF beams, respectively, using a selected number of the plurality of antenna elements;
determine an optimized codebook among the plurality of beamforming codebooks that includes a plurality of optimized codewords for forming the predetermined number of RF beams, respectively, using an optimized number of the plurality of antenna elements; and
optimize each of the plurality of synthesized codewords in the at least one synthesized codebook based on a respective one of the plurality of optimized codewords in the optimized codebook.

2. The wireless node of claim 1, wherein the codeword synthesis circuit is further configured to execute a predefined partitioning algorithm to partition the coverage area into the plurality of coverage clusters.

3. The wireless node of claim 1, wherein the codeword synthesis circuit is further configured to receive a predefined partitioning map and partition the coverage area into the plurality of coverage clusters based on the predefined partitioning map.

4. The wireless node of claim 1, further comprising:
a memory circuit configured to store the at least one synthesized codebook and the optimized codebook; and
a beamformer circuit configured to:
dynamically select one of the at least one synthesized codebook and the optimized codebook;
process an RF signal based on the selected one of the at least one synthesized codebook and the optimized codebook to generate a plurality of beamforming RF signals;
provide the plurality of beamforming RF signals to the selected number of the plurality of antenna elements in response to selecting the at least one synthesized codebook; and
provide the plurality of beamforming RF signals to the optimized number of the plurality of antenna elements in response to selecting the optimized codebook.

5. The wireless node of claim 4, wherein the selected number of the plurality of antenna elements includes a subset of the plurality of antenna elements and the optimized number of the plurality of antenna elements includes all the plurality of antenna elements.

6. The wireless node of claim 4, wherein the selected number of the plurality of antenna elements includes all the plurality of antenna elements and the optimized number of the plurality of antenna elements includes a subset of the plurality of antenna elements.

7. The wireless node of claim 1, wherein the codeword synthesis circuit is further configured to:
calculate a respective synthesized beam heatmap and a respective optimized beam heatmap for each pair of related beams among the predetermined number of RF beams formed based on the at least one synthesized codebook and the predetermined number of RF beams formed based on the optimized codebook;
compare the respective synthesized beam heatmap and the respective optimized beam heatmap of each pair of related beams to determine a respective matching quality; and
adjust a respective one of the plurality of synthesized codewords in the at least one synthesized codebook until the respective matching quality satisfies a predefined threshold.

8. A method for synthesizing a codebook for radio frequency (RF) beamforming in a wireless communications system (WCS), comprising:
partitioning a coverage area into a plurality of coverage clusters each configured to receive a respective one of a predetermined number of RF beams;
determining at least one synthesized codebook among a plurality of beamforming codebooks that includes a plurality of synthesized codewords for forming the predetermined number of RF beams, respectively, using a selected number of a plurality of antenna elements;
determining an optimized codebook among the plurality of beamforming codebooks that includes a plurality of optimized codewords for forming the predetermined number of RF beams, respectively, using an optimized number of the plurality of antenna elements; and
optimizing each of the plurality of synthesized codewords in the at least one synthesized codebook based on a respective one of the plurality of optimized codewords in the optimized codebook.

9. The method of claim 8, further comprising executing a predefined partitioning algorithm to partition the coverage area into the plurality of coverage clusters.

10. The method of claim 8, further comprising receiving a predefined partitioning map and partitioning the coverage area into the plurality of coverage clusters based on the predefined partitioning map.

11. The method of claim 8, wherein the selected number of the plurality of antenna elements includes a subset of the plurality of antenna elements and the optimized number of the plurality of antenna elements includes all the plurality of antenna elements.

12. The method of claim 8, wherein the selected number of the plurality of antenna elements includes all the plurality of antenna elements and the optimized number of the plurality of antenna elements includes a subset of the plurality of antenna elements.

13. The method of claim 8, further comprising:
calculating a respective synthesized beam heatmap and a respective optimized beam heatmap for each pair of related beams among the predetermined number of RF beams formed based on the at least one synthesized codebook and the predetermined number of RF beams formed based on the optimized codebook;
comparing the respective synthesized beam heatmap and the respective optimized beam heatmap of each pair of related beams to determine a respective matching quality; and
adjusting a respective one of the plurality of synthesized codewords in the at least one synthesized codebook until the respective matching quality satisfies a predefined threshold.

14. A wireless communications system (WCS), comprising:
- a centralized services node coupled to a service node; and
- at least one wireless node coupled to the centralized services node and comprising:
  - an antenna array comprising a plurality of antenna elements and configured to emit a predetermined number of radio frequency (RF) beams in a coverage area; and
  - a codeword synthesis circuit configured to:
    - partition the coverage area into a plurality of coverage clusters each configured to receive a respective one of the predetermined number of RF beams;
    - determine at least one synthesized codebook among a plurality of beamforming codebooks that includes a plurality of synthesized codewords for forming the predetermined number of RF beams, respectively, using a selected number of the plurality of antenna elements;
    - determine an optimized codebook among the plurality of beamforming codebooks that includes a plurality of optimized codewords for forming the predetermined number of RF beams, respectively, using an optimized number of the plurality of antenna elements; and
    - optimize each of the plurality of synthesized codewords in the at least one synthesized codebook based on a respective one of the plurality of optimized codewords in the optimized codebook.

15. The WCS of claim 14, wherein the at least one wireless node further comprises:
- a memory circuit configured to store the at least one synthesized codebook and the optimized codebook; and
- a beamformer circuit configured to:
  - dynamically select one of the at least one synthesized codebook and the optimized codebook;
  - process an RF signal based on the selected one of the at least one synthesized codebook and the optimized codebook to generate a plurality of beamforming RF signals;
  - provide the plurality of beamforming RF signals to the selected number of the plurality of antenna elements in response to selecting the at least one synthesized codebook; and
  - provide the plurality of beamforming RF signals to the optimized number of the plurality of antenna elements in response to selecting the optimized codebook.

16. The WCS of claim 14, wherein the at least one wireless node comprises at least one radio node.

17. The WCS of claim 14, wherein the at least one wireless node comprises at least one radio access network (RAN) remote unit.

18. The WCS of claim 14, further comprising a routing unit (RU) coupled to the centralized services node and a plurality of remote units coupled to the RU, wherein the at least one wireless node comprises at least one of the plurality of remote units.

19. The WCS of claim 18, wherein the plurality of remote units is coupled to the RU via a plurality of optical fiber-based communications mediums.

20. The WCS of claim 19, wherein:
- the RU comprises:
  - an electrical-to-optical (E/O) converter configured to convert a plurality of downlink communications signals into a plurality of downlink optical communications signals, respectively; and
  - an optical-to-electrical (O/E) converter configured to convert a plurality of uplink optical communications signals into a plurality of uplink communications signals, respectively; and
- the plurality of remote units each comprises:
  - a respective O/E converter configured to convert a respective one of the plurality of downlink optical communications signals into a respective one of the plurality of downlink communications signals; and
  - a respective E/O converter configured to convert a respective one of the plurality of uplink communications signals into a respective one of the plurality of uplink optical communications signals.

* * * * *